US012466189B2

(12) United States Patent
Niimi

(10) Patent No.: US 12,466,189 B2
(45) Date of Patent: Nov. 11, 2025

(54) INKJET RECORDING APPARATUS

(71) Applicant: KYOCERA Document Solutions Inc., Osaka (JP)

(72) Inventor: Yuna Niimi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 188 days.

(21) Appl. No.: 18/459,176

(22) Filed: Aug. 31, 2023

(65) Prior Publication Data

US 2024/0075744 A1 Mar. 7, 2024

(30) Foreign Application Priority Data

Sep. 6, 2022 (JP) ................................ 2022-141439

(51) Int. Cl.
*B41J 2/175* (2006.01)
*B41J 2/165* (2006.01)

(52) U.S. Cl.
CPC ........... *B41J 2/175* (2013.01); *B41J 2/16552* (2013.01); *B41J 2002/16558* (2013.01)

(58) Field of Classification Search
CPC .................... B41J 2/175; B41J 2/16552; B41J 2002/16558
See application file for complete search history.

(56) References Cited

U.S. PATENT DOCUMENTS

| | | | | |
|---|---|---|---|---|
| 7,699,453 | B2 | 4/2010 | Ishizawa et al. | |
| 7,926,926 | B2 | 4/2011 | Ishizawa et al. | |
| 7,971,976 | B2 | 7/2011 | Ishizawa et al. | |
| 8,141,992 | B2 | 3/2012 | Ishizawa et al. | |
| 10,792,929 | B2 | 10/2020 | Maeshima | |
| 2017/0246878 | A1* | 8/2017 | Kudo | B41J 2/19 |

FOREIGN PATENT DOCUMENTS

| | | | |
|---|---|---|---|
| JP | 2019-25741 | A | 2/2019 |
| JP | 2021-171998 | A | 11/2021 |
| WO | 2007/122795 | A1 | 11/2007 |

* cited by examiner

*Primary Examiner* — Jason S Uhlenhake
(74) *Attorney, Agent, or Firm* — Studebaker Brackett PLLC

(57) ABSTRACT

An inkjet recording device includes a first tank, a second tank and a communicating passage. The first tank stores a first liquid containing a volatile component and supplies the first liquid to an inkjet head. The second tank has a vent hole leading to an atmosphere and stores a second liquid containing the volatile component. The communicating passage communicates a space above a liquid level in the first tank with a space above a liquid level in the second tank.

5 Claims, 10 Drawing Sheets

INKJET RECORDING APPARATUS

INCORPORATION BY REFERENCE

This application is based on and claims the benefit of priority from Japanese patent application No. 2022-141439 filed on Sep. 6, 2022, which is incorporated by reference in its entirety.

BACKGROUND

The present disclosure relates to an inkjet recording apparatus.

As an example of a technique for forming a concave meniscus in a nozzle of an inkjet head, a configuration is known in which a sub-tank is provided between an ink container and the inkjet head, and a negative pressure is generated in the nozzle by lowering the liquid level of the sub-tank below the nozzle level. In this case, since the internal pressure of the sub-tank must be equal to the atmospheric pressure, a vent hole to the atmosphere is provided in the sub-tank. However, since the liquid level in the sub-tank comes in contact with the atmosphere, volatile components (water, organic solvents or the like) easily evaporate from the ink, which increases the viscosity of the ink and causes ejection failure.

As a means of suppressing the evaporation of volatile components, a technique in which a check valve is provided at the vent hole and the pressure at which the check valve is opened is set higher than the saturated vapor pressure of the volatile components. However, a mechanism is required to open the air in the sub-tank to the atmosphere during the image forming operation, and there are some problems such as increasing of the cost, increasing of the volume of the equipment, and complicates control.

In addition, there is a configuration in which a narrow portion is provided in the middle of a passage leading to the atmosphere such that the ink is held by the meniscus. It is configured such that the ink contained in the storage chamber is blocked from the atmosphere by the ink held in the narrow portion of the passage, and the internal pressure of the storage chamber is kept constant by passing minute bubbles. However, this configuration is intended for an ink cartridge, so the inflow of ink is not expected. On the other hand, in the sub-tank, since the inflow and outflow of ink is repeated, the ink may be pushed out from the narrow portion of the passage to the atmospheric when it flows in.

SUMMARY

An inkjet recording device according to the present disclosure includes a first tank, a second tank and a communicating passage. The first tank stores a first liquid containing a volatile component and supplies the first liquid to an inkjet head. The second tank has a vent hole leading to an atmosphere and stores a second liquid containing the volatile component. The communicating passage communicates a space above a liquid level in the first tank with a space above a liquid level in the second tank.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an inkjet recording device 1 and a cap unit 70 according to one embodiment of the present disclosure will be described.

Figure 1:
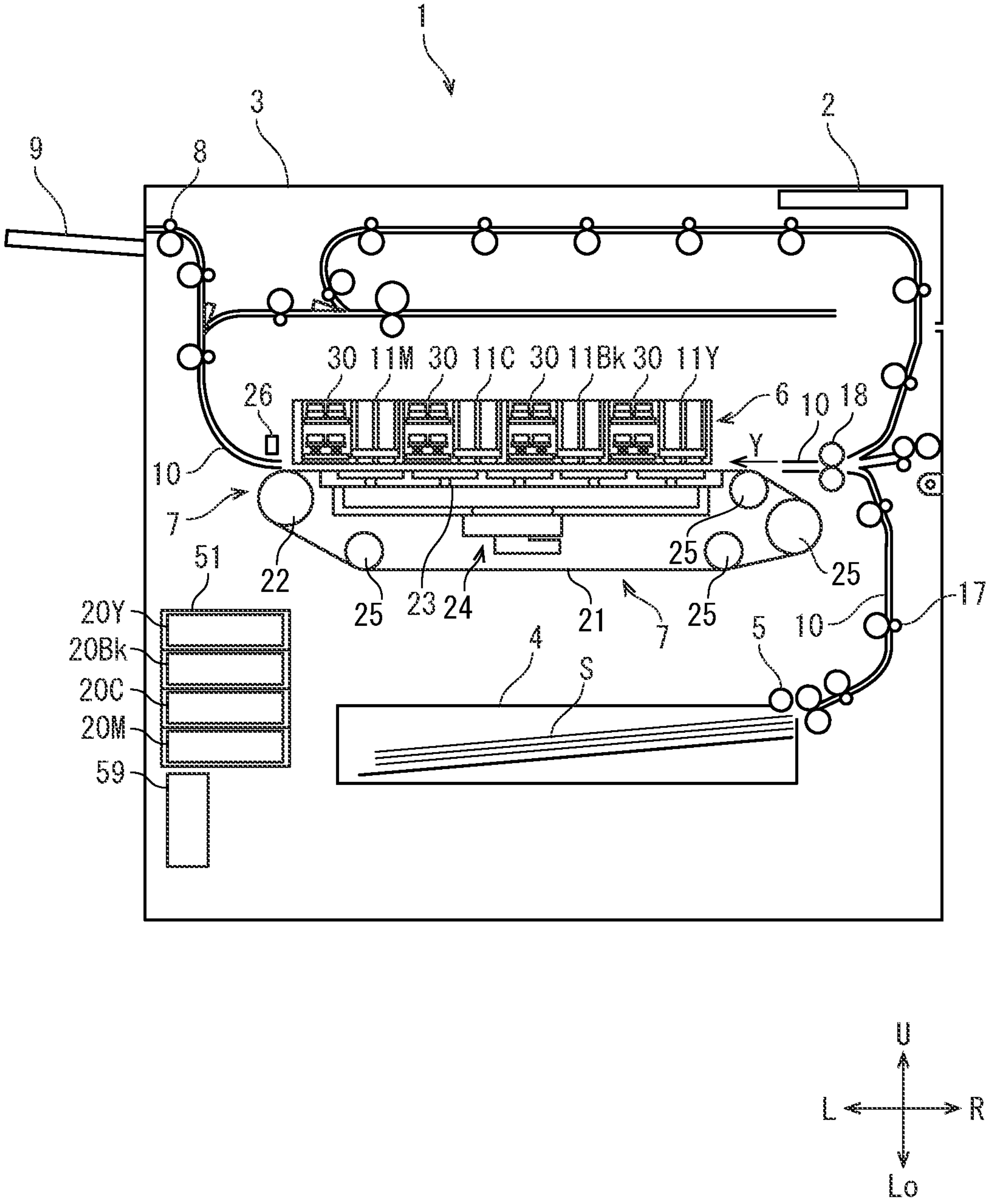
FIG. 1 is a front view schematically showing an inside of an inkjet recording device according to one embodiment of the present disclosure.
Figure 2:
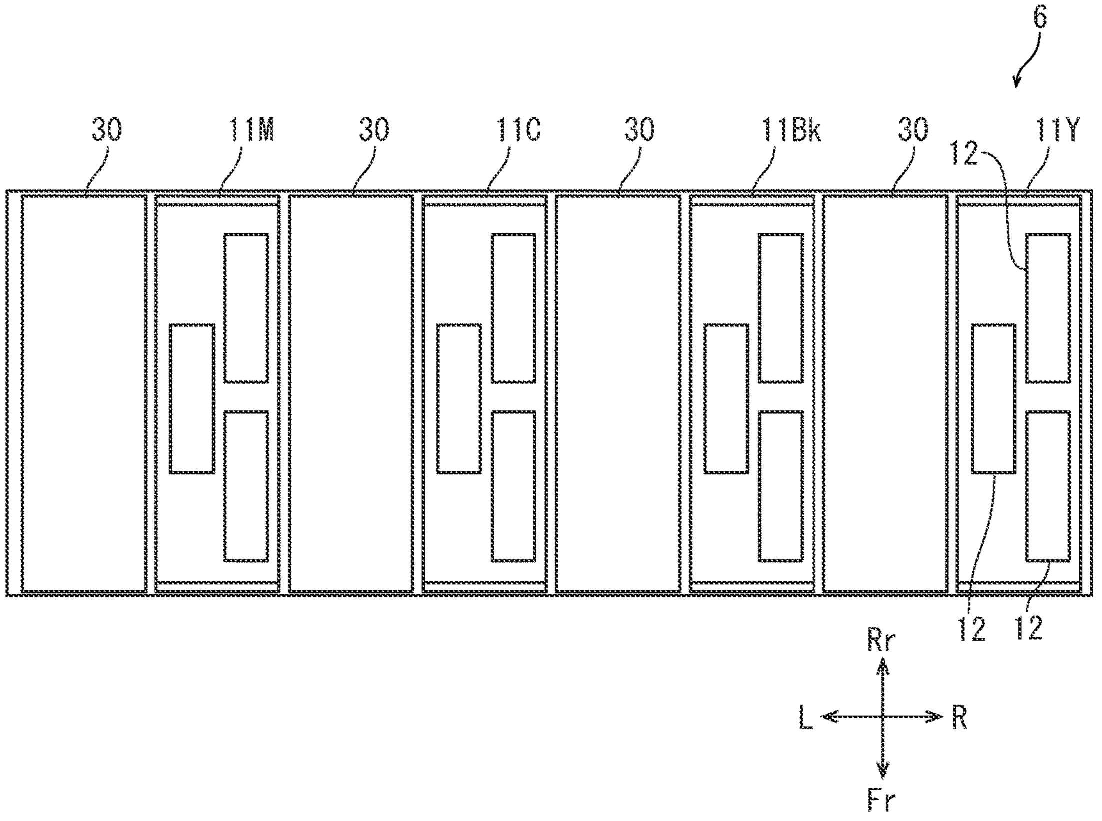
FIG. 2 is a plan view showing an image forming unit according to the embodiment of the present disclosure.
Figure 3:
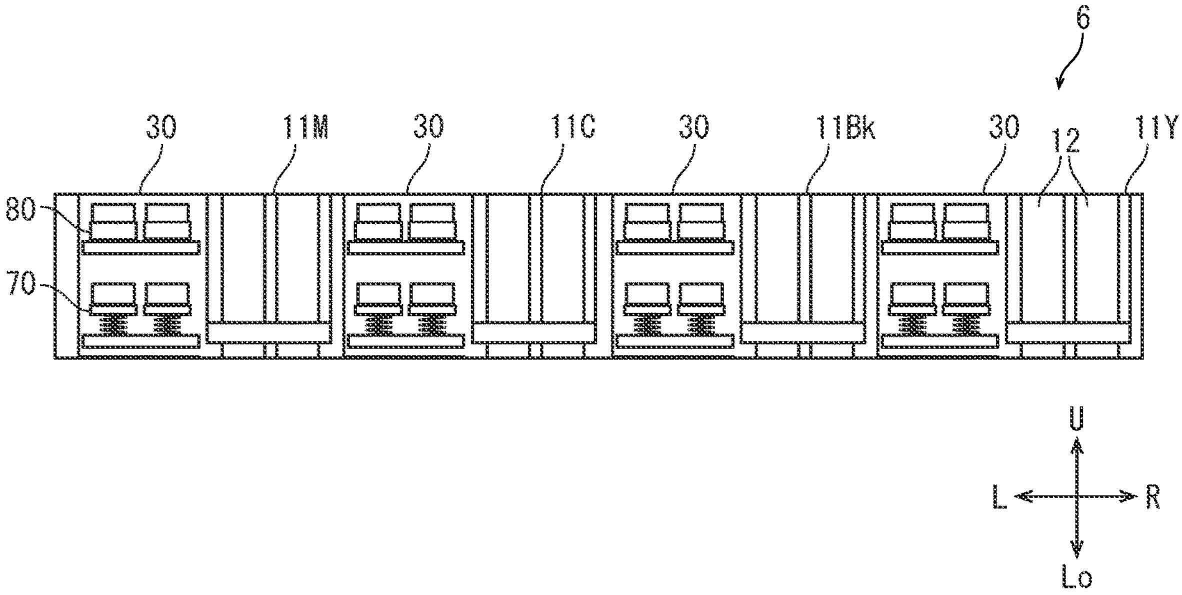
FIG. 3 is a sectional view showing the image forming unit according to the embodiment of the present disclosure.
Figure 4:
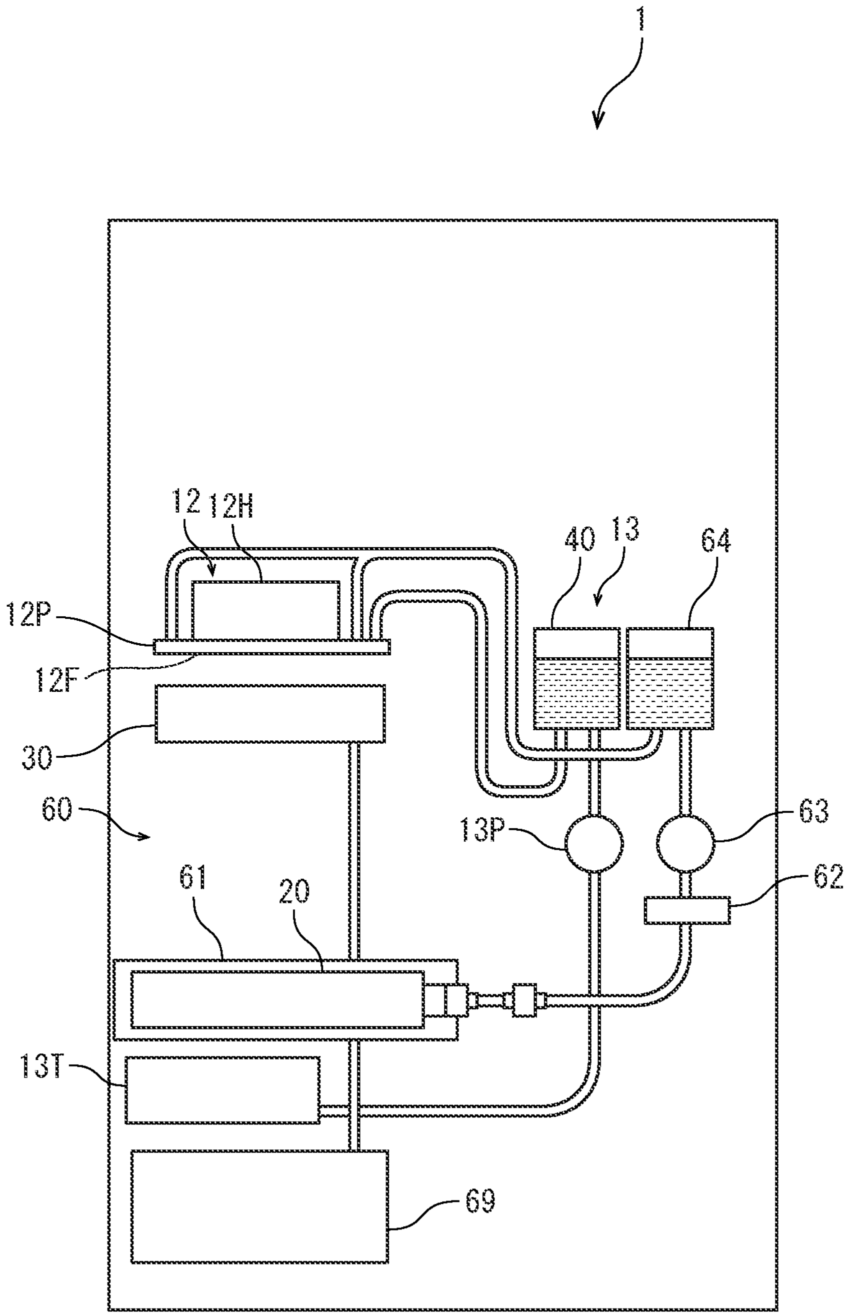
FIG. 4 is a diagram schematically showing an ink supply path according to the embodiment of the present disclosure.
Figure 5:
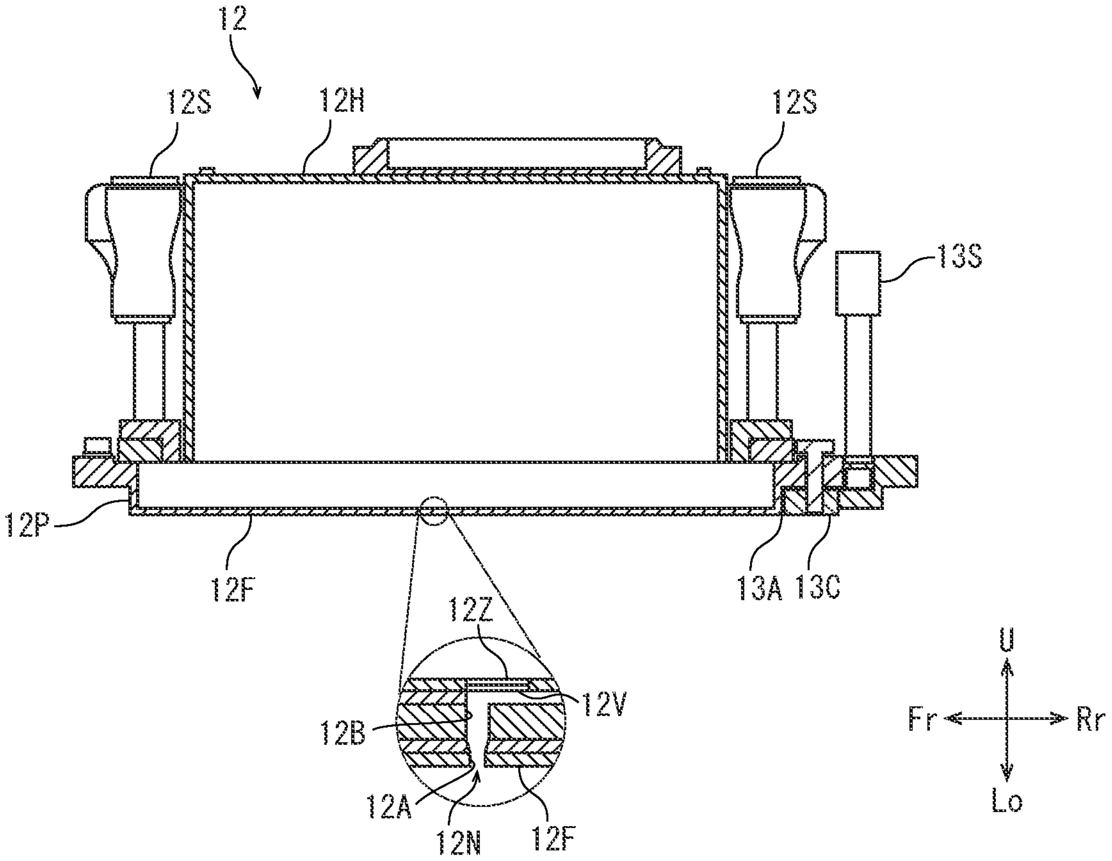
FIG. 5 is a sectional view showing an inkjet head according to the embodiment of the present disclosure.

First, the entire configuration of the inkjet recording device 1 will be described. FIG. 1 is a front view schematically showing the inside of the inkjet recording device 1. FIG. 2 is a plan view showing the image forming unit 6. FIG. 3 is a sectional view showing the image forming unit 6. FIG. 4 is a diagram schematically showing the ink supply path 60. FIG. 5 is a sectional view showing an inkjet head 12. IG. 6 is a diagram schematically showing a sub-ink tank 64, a sub-cleaning liquid tank 40 and their peripheral parts. Hereafter, the front side of paper plan on which the inkjet recording device 1 is drawn is defined as the front side of the inkjet recording device 1, and the left-and-right direction is described with reference to the direction in which the inkjet recording device 1 is viewed from the front side. In each drawing, U, Lo, L, R, Fr and Rr indicate the upper, lower, left, right, front and rear, respectively.

The inkjet recording device 1 (see FIG. 1) includes a rectangular box-shaped body housing 3. In the lower portion of the body housing 3, a sheet feeding cassette 4 in which a sheet S such as a plain paper and a coated paper is stored, and a sheet feeding roller 5 which feeds the sheet S from the sheet feeding cassette 4 are provided. Above the sheet feeding cassette 4, a conveying unit 7 is provided, which attracts the sheet S and conveys it in the Y direction. An image forming unit 6 is provided above the conveying unit 7 to form an image by ejecting ink. A discharge roller 8 which discharges the sheet S having the image and a discharge tray 9 on which the discharged sheet S is stacked are provided in the upper left portion in the body housing 3.

Inside the body housing 3, a conveyance path 10 is provided from the sheet feeding roller 5 through a gap between the conveying unit 7 and the image forming unit 6 to the discharge roller 8. The conveyance path 10 is formed mainly by plate-like members facing each other with a gap for passing the sheet S. On the conveyance path 10, a conveying roller 17 which holds and conveys the sheet S is provided. A registration roller 18 is provided on the upstream side of the image forming unit 6 in the conveyance direction Y.

The conveying unit 7 includes an endless conveyance belt 21, a support plate 23, and a suction part 24. The conveyance belt 21 has a large number of vent holes (not shown) and is stretched between a driving roller 25 and a driven roller 22. The support plate 23 has a large number of vent holes, and the upper surface is in contact with the inner surface of the conveyance belt 21. The suction part 24 attracts the sheet S to the conveyance belt 21 by sucking air through the vent holes of the support plate 23 and the vent holes of the conveyance belt 21. When the driving roller 25 is driven in the counterclockwise direction by a driving unit (not shown) including a motor and a reduction gear, the conveyance belt 21 is traveled in the counterclockwise direction, and the sheet S attracted by the conveyance belt 21 is conveyed in the Y direction.

The image forming unit 6 (see FIG. 2 and FIG. 3) includes head units 11Y, 11Bk, 11C and 11M (collectively referred to as a head unit 11). The head unit 11 includes one or more inkjet heads 12, for example, three inkjet heads 12 arranged in a staggered manner. Ink containers 20Y, 20Bk, 20C, and 20M (collectively referred to as an ink container 20) filled with yellow, black, cyan, and magenta inks are connected to the head units 11Y, 11Bk, 11C, and 11M, respectively, through ink supply paths 60 (see FIG. 4).

In FIG. 4, an ink supply path 60 corresponding to one color of ink is shown, but since four colors of ink are used in this embodiment, four ink supply paths 60 are actually provided. The inkjet recording device 1 includes a container attachment part 61 to which the ink container 20 is attached, a filter 62 which filters the ink, a pump 63 which pumps the ink from the ink container 20 through the filter 62, and a sub-ink tank 64 in which the ink delivered from the pump 63 is stored. Although one inkjet head 12 is shown in FIG. 4, three inkjet heads 12 included in one head unit 11 are connected to one sub-ink tank 64.

The inkjet head 12 (see FIG. 5 and FIG. 6) includes a rectangular box-shaped housing 12H whose longitudinal direction is along the front-and rear direction, and a nozzle plate 12P provided at the bottom of the housing 12H. The nozzle plate 12P has a number of nozzles 12N lined up in the front-and-rear direction and a socket 12S to which a pipe 642 from the sub-ink tank 64 is connected. The nozzle 12N includes a branch channel 12B branched from the downstream side portion of the socket 12S and an ejection port 12A provided on the nozzle surface 12F, which is the lower surface of the nozzle plate 12P. A diaphragm 12V is acted as a part of the inner wall of the branch channel 12B. The diaphragm 12V is provided with a pressurizing element 12Z. As the pressurizing element 12Z, a piezoelectric element, an electrostatic actuator, a heater or the like are used. A drive circuit (not shown) for driving the pressurizing element 12Z is connected to the pressurizing element 12Z. The liquid level 64L in the sub-ink tank 64 is adjusted to be slightly lower than the nozzle surface 12F. By making the liquid level 64L lower than the nozzle surface 12F, negative pressure is generated in the nozzle 12N and a concave meniscus concave upward is formed.

The control part 2 (see FIG. 1) includes an arithmetic part and a storage part (not shown). The arithmetic part is, for example, a CPU (Central Processing Unit). The storage part includes a storage media such as a ROM (Read Only Memory), a RAM (Random Access Memory) and an EEPROM (Electrically Erasable Programmable Read Only Memory). The arithmetic part performs various processes by reading and executing the control program stored in the storage part. The control part 2 may be realized by an integrated circuit without using software.

A display operating part 19 is provided in the upper portion of the body housing 3 (see FIG. 1). The display operating part 19 includes a display panel, a touch panel laminated on the display panel, and a keypad (not shown). The control part 2 displays a screen showing the operation menu, status or the like of the inkjet recording device 1 on the display panel, and controls each part of the inkjet recording device 1 according to the operation detected by the touch panel and the keypad.

The basic image forming operation of the inkjet recording device 1 is as follows. When an image forming job is input to the inkjet recording device 1 from the display operating part 19 or an external computer, the sheet feeding roller 5 feeds the sheet S from the sheet feeding cassette 4 to the conveyance path 10, and the registration roller 18, whose rotation is stopped, corrects the skew of the sheet S. When the registration roller 18 feeds the sheet S to the conveying unit at a prescribed timing, the conveying unit 7 attracts the sheet S to the conveyance belt 21 and conveys it in the Y direction. When the control part 2 supplies the raster-type image data to the drive circuit in synchronization with the conveyance of the sheet S, the drive circuit supplies an ejection signal corresponding to the gradation of the image data to the pressurizing element 12Z, and the ink is ejected from the nozzle 12N to form an image on the sheet S. The discharge roller 8 discharges the sheet S on which the image is formed to the discharge tray 9.

Figure 7:
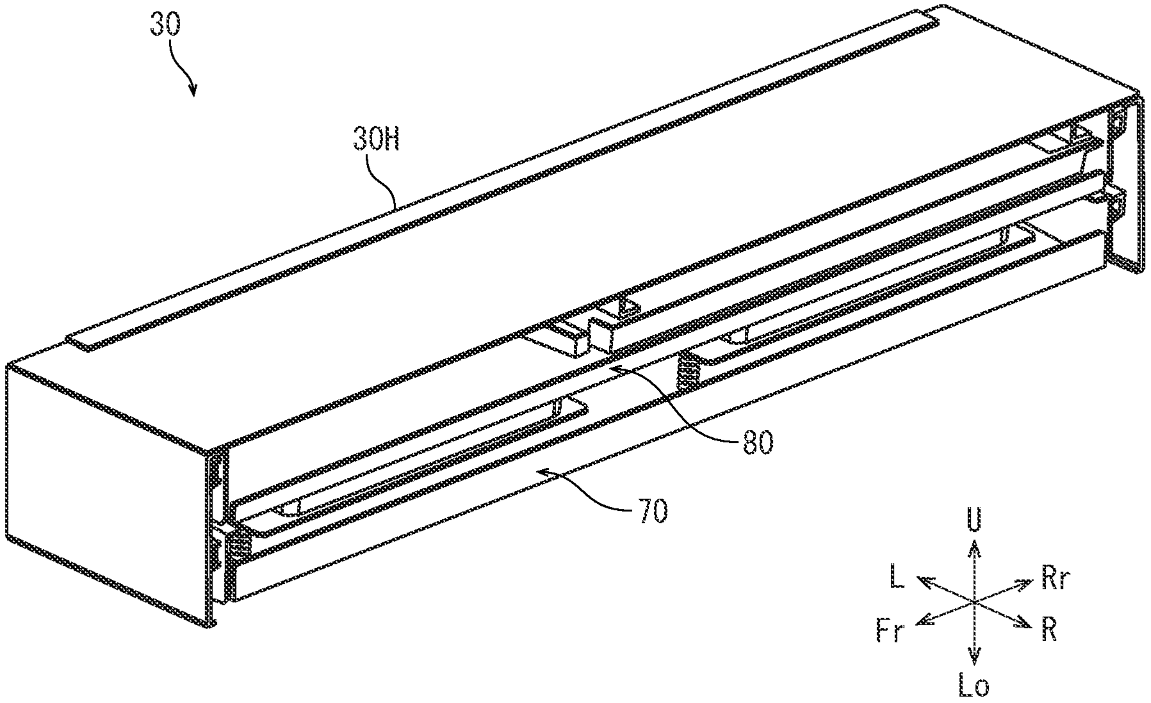
FIG. 7 is a perspective view showing a maintenance device according to the embodiment of the present disclosure.
Figure 8:
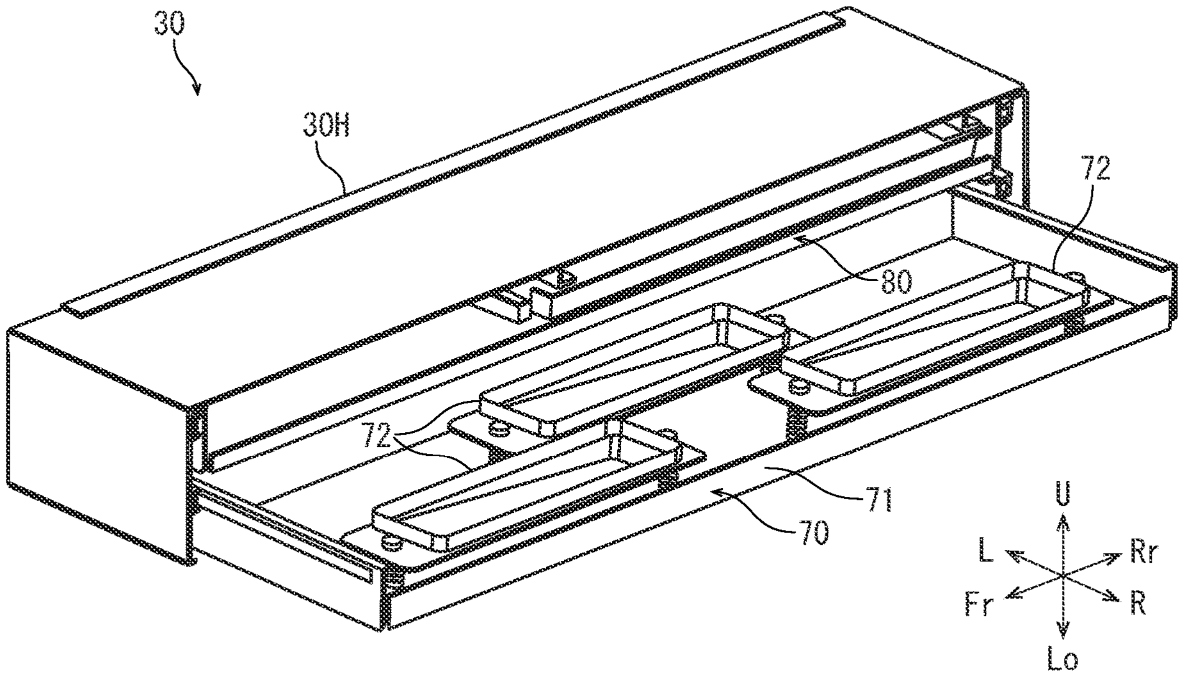
FIG. 8 is a perspective view showing a cap unit shifted rightward, according to the embodiment of the present disclosure.
Figure 9:
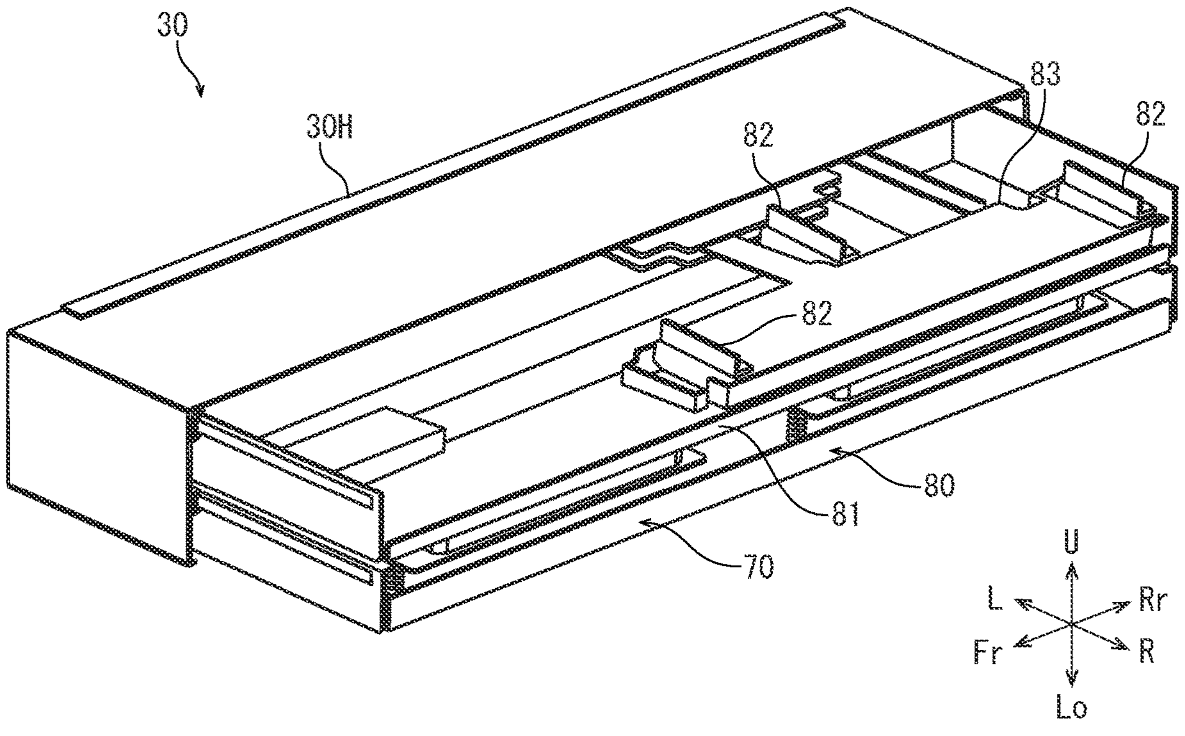
FIG. 9 is a perspective view showing a wipe unit and the cap unit which are shifted rightward, according to the embodiment of the present disclosure are slid to the right.
Figure 10:
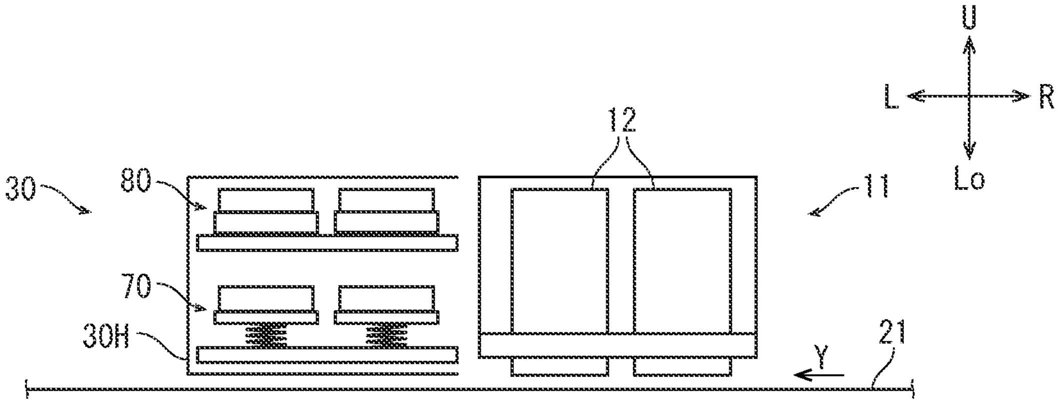
FIG. 10 is a sectional view explaining an operation of the maintenance device and the head unit according to the embodiment of the present disclosure.

[Maintenance Device] Next, the configuration of the maintenance device 30 is described. FIG. 7 is a perspective view showing the maintenance device 30. FIG. 8 is a perspective view showing a cap unit 70 shifted rightward. FIG. 9 is a perspective view showing a wipe unit 80 and the cap unit 70 shifted rightward.

The maintenance device 30 is provided for each head unit 11 on the left side of each head unit 11 (on the downstream side in the conveyance direction Y) (see FIG. 2 and FIG. 3). The maintenance device 30 may be provided on the right side of each head unit 11 (on the upstream side in the conveyance direction Y). The maintenance device 30 includes the cap unit 70 with a cap 72 which covers the nozzle surface 12F, the wipe unit 80 with a wipe blade 82 which removing the ink remaining on the nozzle surface 12F, and a housing 31 in which the cap unit 70 and the wipe unit 80 are housed. The housing 31 is formed in a rectangular box-like shape whose longitudinal direction is along the front-and-rear direction, and an opening is provided on the right side surface. The maintenance device 30 includes a cap slide mechanism (not shown) which moves the cap unit 70 in the left-and-right direction and a wipe slide mechanism (not shown) which moves the wipe unit 80 in the left-and right-direction.

[Cap Unit] The cap unit 70 (see FIG. 8) includes a frame 71 and a cap 72 provided above the frame 71. The frame 71 is formed into a rectangular shape whose longitudinal direction is along the front-and-rear direction. The same number of caps 72 as the inkjet heads 12 are arranged in the frame in a staggered manner like the inkjet heads 12. The cap 72 has an upper open recess. The recess has a size that surrounds the nozzle surface 12F of one inkjet head 12. The bottom of the recess is inclined so that one side (in this example, the rear side) in the front-and-rear direction is lower. A discharge port is provided at the lower end portion of the bottom of the recess (not shown). A waste liquid tank 69 (see FIG. 4) is connected to the discharge port.

[Wipe Unit] The wipe unit 80 (see FIG. 9) includes a frame 81, a carriage 83 provided above the frame 81, a wipe blade 82 projecting upward from the carriage 83, and a carriage slide mechanism (not shown) which moves the carriage 83 in the front-and-rear direction. The frame 81 is formed into a rectangular box-like shape whose longitudinal direction is along the front-and-rear direction. The same number of wipe blades 82 as the inkjet heads 12 are arranged in the carriage 83 in a staggered manner like the inkjet heads 12.

[Lifting Mechanism] The inkjet recording device 1 including a lifting mechanism (not shown) which lifts and lowers the head unit 11. The lifting mechanism lifts and lowers the head unit 11 between an image forming position when the image is formed and a retreating position above the image forming position. At the image forming position, the head unit 11 is positioned so that the distance between the conveyance belt 21 and the nozzle surface 12F is set to a predetermined distance. In the retreating position, a space is formed between the conveyance belt 21 and the nozzle surface 12F, to which the cap unit 70 and the wipe unit 80 can be moved.

[Cleaning Liquid Supply Part] The inkjet head 12 includes a cleaning liquid supply part 13 (see FIG. 4 and FIG. 6) that supplies a cleaning liquid to the nozzle surface 12F. The cleaning liquid supply part 13 includes a cleaning liquid tank 13T, a pump 13P, a sub-cleaning liquid tank 40, a socket 13S, and a connecting member 13C. In the cleaning liquid tank 13T, a cleaning liquid containing mainly of water is stored. The pump 13P is connected to the bottom of the sub-cleaning liquid tank 40 and pumps the cleaning liquid from the cleaning liquid tank 13T to the sub-cleaning liquid tank 40. The connecting member 13C is provided behind the nozzle plate 12P. The connecting member 13C includes the socket 13S to which a pipe 402 from the sub-cleaning liquid tank 40 is connected. A cleaning liquid supply port 13A is provided at the bottom of the connecting member 13C. The liquid level 40L in the sub-cleaning liquid tank 40 is adjusted to be slightly higher than the bottom surface of the connecting member 13C. By making the liquid level 40L higher than the bottom, positive pressure is generated in the cleaning liquid supply port 13A, and a convex meniscus protruding downward is formed.

Next, the operation of the maintenance device 30 will be described. FIG. 10 to FIG. 15 are sectional views showing the operation of the maintenance device 30 and the head unit 11. Hereafter, a state in which the head unit 11 is positioned at the image forming position (see FIG. 10) is described as the initial state. The operations shown below are performed by the control part 2 controlling the lifting mechanism, the cap sliding mechanism, the wipe sliding mechanism and the carriage sliding mechanism.

Figure 11:
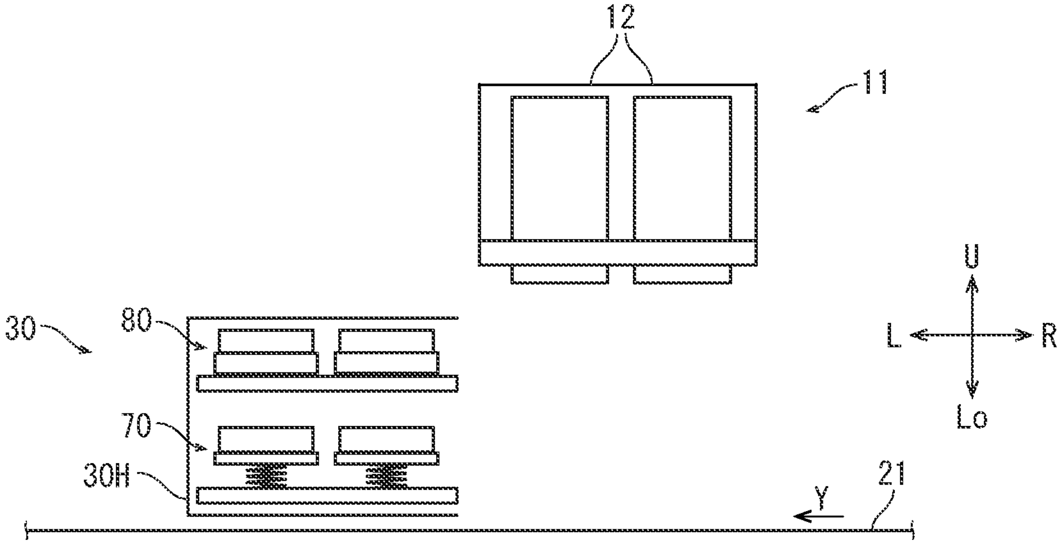
FIG. 11 is a sectional view explaining the operation of the maintenance device and the head unit according to the embodiment of the present disclosure.

First, the control part 2 operates the lifting mechanism to lift the head unit 11 to the retreating position (see FIG. 11). Then, the control part 2 operates the cap slide mechanism to move the cap unit 70 below the head unit 11 (see FIG. 12). Next, the control part 2 operates the lifting mechanism to lower the head unit 11 to a height where the nozzle surface 12F is in contact with the cap 72 (see FIG. 13). Next, the control part 2 controls the inkjet head 12 to cause the cap 72 to purge the ink.

Figure 12:
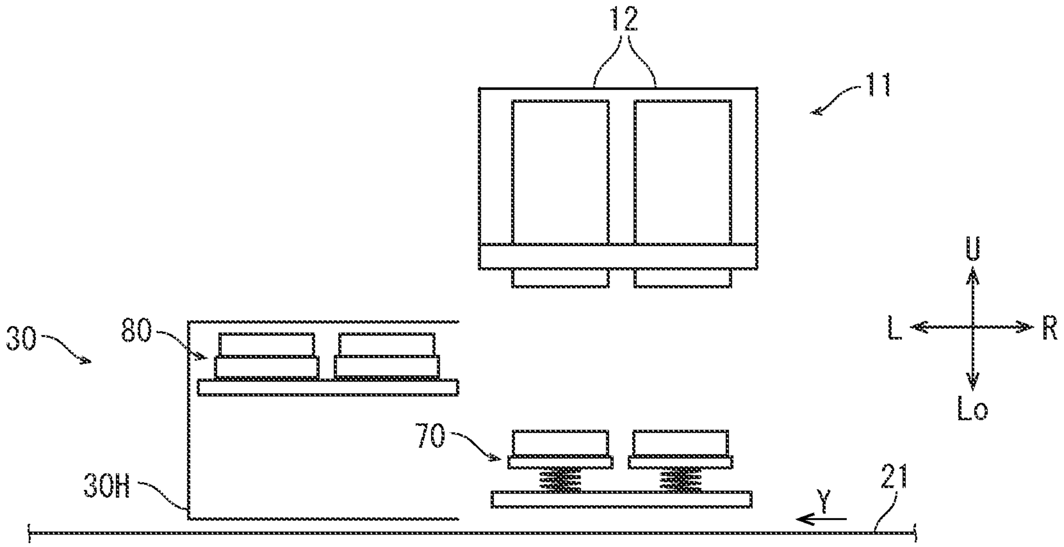
FIG. 12 is a sectional view explaining the operation of the maintenance device and the head unit according to the embodiment of the present disclosure.
Figure 13:
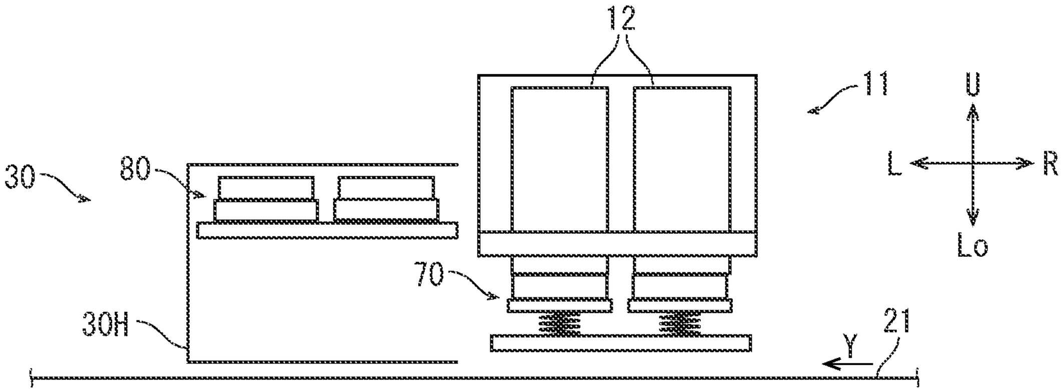
FIG. 13 is a sectional view explaining the operation of the maintenance device and the head unit according to the embodiment of the present disclosure.

Next, the control part 2 operates the lifting mechanism to lift the head unit 11 to the retreating position (see FIG. 12). Next, the control part 2 operates the wipe slide mechanism to move the wipe unit 80 below the head unit 11 (see FIG. 14). The control part 2 then operates the lifting mechanism to lower the head unit 11 to a height where the nozzle surface 12F is in contact with the wipe blade 82 (see FIG. 15).

Then, the control part 2 operates the cleaning liquid supply part 13 to supply the cleaning liquid to the nozzle surface 12F, and operates the carriage slide mechanism to move the wipe blade 82. The wipe blade 82 moves while scraping the cleaning liquid and the ink from the nozzle surface 12F. The ink is diluted with the cleaning liquid and falls off. The waste liquid, which is a mixture of the ink and the cleaning liquid, is received by the cap 72.

Figure 14:
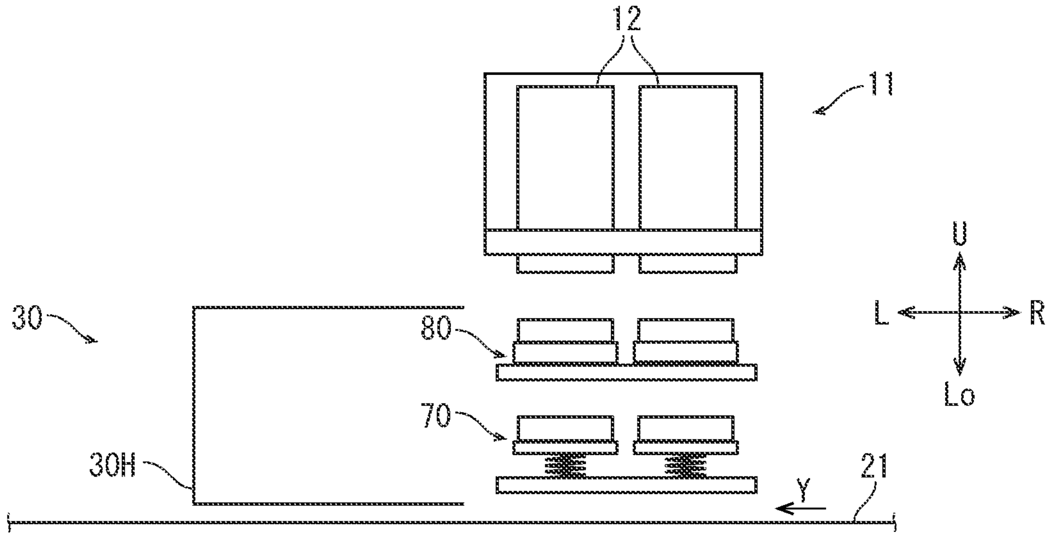
FIG. 14 is a sectional view explaining the operation of the maintenance device and the head unit according to the embodiment of the present disclosure.
Figure 15:
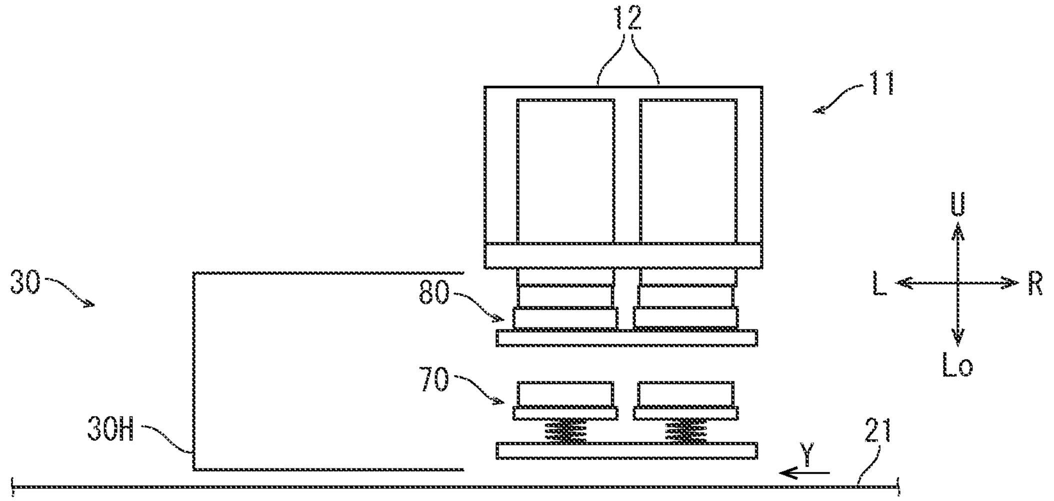
FIG. 15 is a sectional view explaining the operation of the maintenance device and the head unit according to the embodiment of the present disclosure.

Next, the control part 2 operates the lifting mechanism to lift the head unit 11 to the retreating position (see FIG. 14). The control part 2 then operates the wipe slide mechanism to accommodate the wipe unit 80 in the housing 31 (see FIG. 12). Next, the control part 2 operates the lifting mechanism to lower the head unit 11 to the height where the nozzle surface 12F is in contact with the cap 72 (see FIG. 13).

When the image forming operation is performed, the control part 2 operates the lifting mechanism to lift the head unit 11 to the retreating position (see FIG. 12). The control part 2 then operates the cap slide mechanism to accommodate the cap unit 70 in the housing 31 (see FIG. 11), and operates the lifting mechanism to lower the head unit 11 to the image forming position (see FIG. 10).

Figure 6:
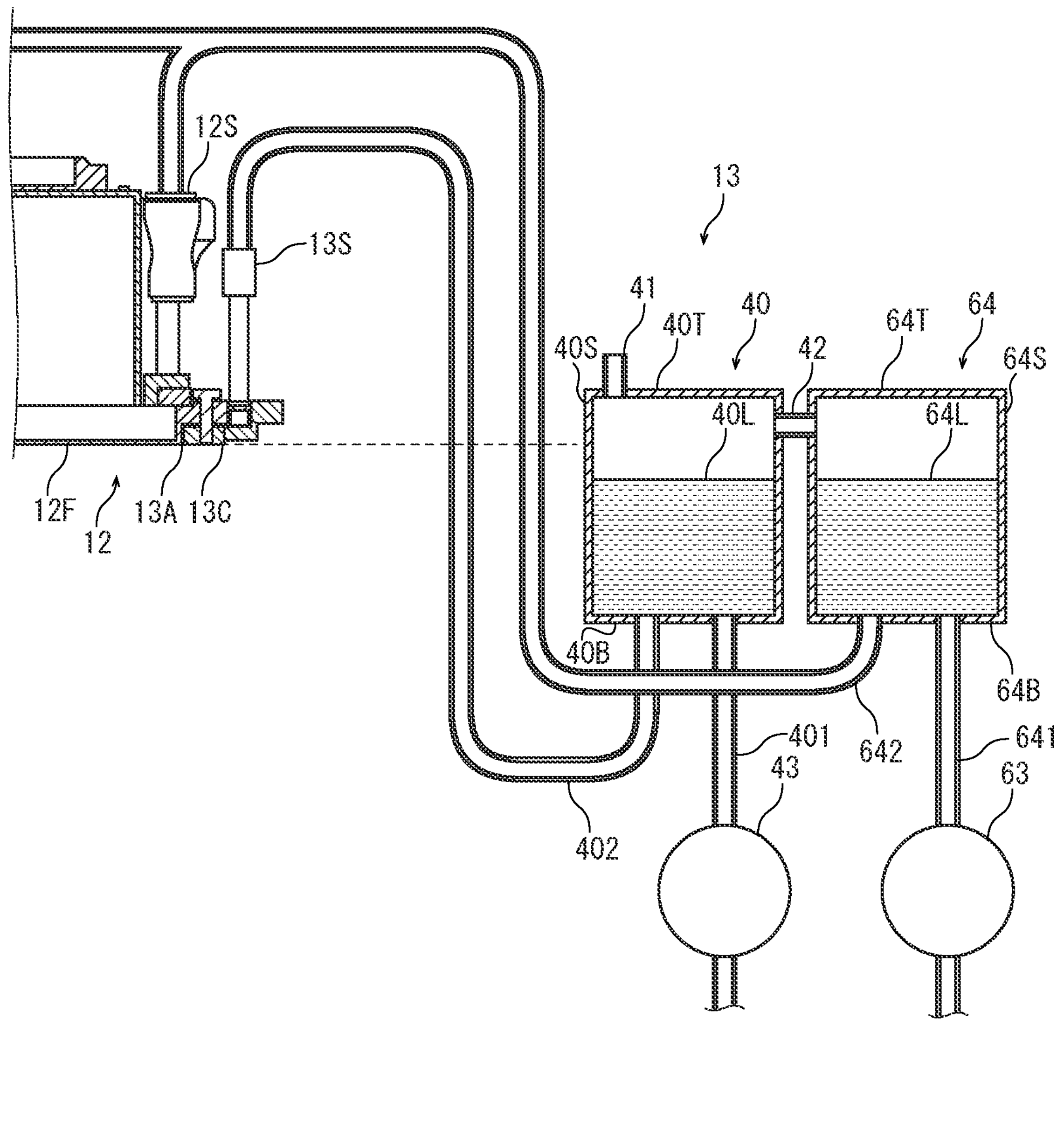
FIG. 6 is a diagram schematically showing a sub-ink tank, a sub-cleaning liquid tank and their peripherals according to the embodiment of the present disclosure.

Next, a mechanism to suppress evaporation of the volatile components from the sub-ink tank 64 will be explained (see FIG. 6). The inkjet recording device 1 according to this embodiment includes the sub-ink tank 64 (an example of a first tank) that stores the ink containing volatile components (an example of a first liquid) and supplies the first liquid to the inkjet head 12, the sub-cleaning liquid tank 40 (an example of a second tank) that has a vent hole 41 leading to the atmosphere and stores the cleaning liquid containing volatile components (an example of a second liquid), and a communicating passage 42 that communicates a space above the liquid level 64L in the sub-ink tank 64 with a space above the liquid level 40L in the sub-cleaning liquid tank 40. Specifically, they are as follows:

[First Tank] The sub-ink tank 64, which is an example of the first tank, is a container with a space in which the ink is stored. The sub-ink tank 64 can be of any shape, but here shows an example in which it has a cylindrical outer shape. The sub-ink tank 64 has a circular bottom plate portion 64B, a cylindrical side wall portion 64*o*S, and a circular top plate portion 64T. The pump 63 is connected to the bottom plate portion 64B through a pipe 641. Inside the sub-ink tank 64, a sensor (not shown) is provided to detect the height of the liquid level 641 of the ink. The pump 63 supplies the ink from the ink container 20 to the sub-ink tank 64 so that the height of the liquid level 64L detected by the sensor is within a predetermined range. One end of a pipe 642 is connected to the bottom plate portion 64B. The other end of the pipe 642 is connected to the socket 13S.

The ink is, for example, a water-based pigment ink, which is composed by dispersing the pigment in a dispersion medium mainly containing water. In this case, the volatile component is water.

[Second Tank] The sub-cleaning liquid tank 40 is adjacent to the sub-ink tank 64. The sub-cleaning liquid tank 40 is a container having a space in which the cleaning liquid is stored. The sub-cleaning liquid tank 40 can be of any shape, but here shows an example in which it has a cylindrical outer shape. The sub-cleaning liquid tank 40 has a circular bottom plate portion 40B, a cylindrical side wall portion 40S, and a circular top plate portion 40T. The pump 43 is connected to the bottom plate portion 40B through a pipe 401. Inside the sub-cleaning liquid tank 40, a sensor (not shown) is provided to detect the height of the liquid level 40L of the cleaning liquid. The pump 43 supplies the cleaning liquid from the cleaning liquid tank 13T to the sub-cleaning liquid tank 40 so that the height of the liquid level 40L detected by the sensor is within a predetermined range. One end of a pipe 402 is connected to the bottom plate portion 40B. The other end of the pipe 402 is connected to the socket 13S.

The cleaning liquid contains, for example, water to which a surfactant is added. In this case, the volatile component is water. The moisture content of the cleaning liquid (one example of the content of volatile components in the second liquid) is higher than that of the ink (one example of the content of volatile components in the first liquid).

A vent hole 41 penetrating in the upper-and-lower direction is provided in the top plate portion 401 of the sub-cleaning liquid tank 40. The vent hole 41 is provided on the side of the top plate portion 401 away from the sub-ink tank 64. The space above the liquid level 40L in the sub-cleaning liquid tank 40 is connected to the atmosphere by the vent hole 41. Therefore, the air pressure in the sub-cleaning liquid tank 40 is equal to the atmospheric pressure.

[Communicating Passage] Between the sub-ink tank 64 and the sub-cleaning liquid tank 40, a communicating passage 42 is provided through which air is freely passed. The communicating passage 42 is a pipe connecting the portion near the upper end of the side wall portion 64S of the sub-ink tank 64 and the portion near the upper end of the side wall portion 40S of the sub-cleaning liquid tank 40. As described above, since the space above the liquid level 40L in the sub-cleaning liquid tank 40 is connected to the atmosphere, the space above the liquid level 64L in the sub-ink tank 64 is also connected to the atmosphere through the communicating passage 42. Therefore, the air pressure in the sub-ink tank 64 is also equal to the atmospheric pressure.

The air in the sub-ink tank 64 contains vapor of water contained in the ink. The air in the sub-cleaning liquid tank 40 contains the vapor of water contained in the cleaning liquid. The communicating passage 42 merely connects the space in the sub-ink tank 64 and the space in the sub-cleaning liquid tank 40, and does not have the function of limiting the air flow in one direction. In addition, since the sub-cleaning liquid tank 40 has the vent hole 41, the air pressure in the sub-ink tank 64 and the air pressure in the sub-cleaning liquid tank 40 become equal to the atmospheric pressure. In order for the vapor generated in the sub-ink tank 64 to be released into the atmosphere, it must pass through the space in the sub-cleaning liquid tank 40. However, since the air in the sub-cleaning liquid tank 40 contains the vapor, it becomes a resistance against the passage of vapor generated in the sub-ink tank 64, which makes it difficult for the vapor to flow into the sub-cleaning liquid tank 40 from the sub-ink tank 64. As a result, the vapor pressure in the sub-ink tank 64 increases and the evaporation of water in the sub-ink tank 64 is suppressed.

The inkjet recording device 1 according to the present embodiment described above includes the sub-ink tank 64 (one example of the first tank) that stores the ink containing the volatile components (one example of the first liquid) and supplies the first liquid to the inkjet head 12, the sub-cleaning liquid tank 40 (one example of the second tank) that has the vent hole 41 leading to the atmosphere and stores the cleaning liquid containing the volatile components (one example of the second liquid), and the communicating passage 42 that connects the space above the liquid level 64L in the sub-ink tank 64 and the space above the liquid level 40L in the sub-cleaning liquid tank 40. With this configuration, the evaporation of the volatile components from the sub-ink tank 64 (one example of the tank leading to the atmosphere) can be suppressed.

In addition, according to the inkjet recording device 1 according to the present embodiment, the moisture content of the cleaning liquid (one example of the content of volatile components in the second liquid) is higher than that of the ink (one example of the content of volatile components in the first liquid). According to this configuration, since the vapor pressure in the sub-cleaning liquid tank 40 becomes higher than that in the sub-ink tank 64, the vapor easily flows from the sub-cleaning liquid tank 40 into the sub-ink tank 64, and the vapor pressure in the sub-ink tank 64 increases. Therefore, according to the present embodiment, the evaporation of the volatile components from the sub-ink tank 64 can be further suppressed.

In addition, according to the inkjet recording device 1 according to the present embodiment, the vent hole 41 is provided above the communicating passage 42. According to this configuration, the flow of vapor generated in the sub-cleaning liquid tank 40 to the vent hole 41 acts as a resistance against the passage of the vapor generated in the sub-ink tank 64, which makes it difficult for the vapor to flow from the sub-ink tank 64 to the sub-cleaning liquid tank 40. Therefore, according to the present embodiment, the evaporation of the volatile components from the sub-ink tank 64 can be further suppressed.

According to the inkjet recording device 1 according to the present embodiment, the second liquid is the cleaning liquid for cleaning the nozzle surface 12F of the inkjet head 12. According to this configuration, since the cleaning liquid provided in the inkjet recording device 1 is used as the second liquid, it is not necessary to prepare a dedicated liquid for suppressing the evaporation of the volatile components, and the cost can be suppressed.

The above embodiment may be modified as follows.

In the above embodiment, an example of using a cleaning liquid as the second liquid is shown, but another liquid may be used as the second liquid. For example, when a configuration is provided in which the drive circuit provided in the inkjet head 12 is cooled by coolant, the coolant may be used as the second liquid.

As the second liquid, a special liquid may be used to suppress the evaporation of the volatile components. For example, a separate tank from the sub-cleaning liquid tank 40 may be provided as a second tank to store water as the second liquid in the second tank. In this case, since the moisture content of the second liquid is higher than that of the cleaning liquid, the evaporation of the volatile components from the first tank can be further suppressed.

The above embodiment shows an example in which the volatile component of the first and second liquids is water, but the volatile component may be an organic solvent. That is, the first liquid may be a solvent-based ink in which pigments are dispersed in an organic solvent, and the second liquid may be an organic solvent.

The invention claimed is:

1. An inkjet recording device comprising:

a first tank which stores a first liquid containing a volatile component and supplies the first liquid to an inkjet head;

a second tank which has a vent hole leading to an atmosphere and stores a second liquid containing the volatile component; and a communicating passage which communicates a space above a liquid level in the first tank with a space above a liquid level in the second tank, wherein a vapor pressure in the second tank is higher than a vapor pressure in the first tank.

2. The inkjet recording device according to claim 1, wherein the vent hole is provided above the communication passage.

3. The inkjet recording device according to claim 1, wherein the vent hole is provided in a top plate of the second tank on a far side from the first tank.

4. The inkjet recording device according to claim 1, wherein the second liquid is a cleaning liquid for cleaning a nozzle surface of the inkjet head.

5. An inkjet recording device comprising:

a first tank which stores a first liquid containing a volatile component and supplies the first liquid to an inkjet head;

a second tank which has a vent hole leading to an atmosphere and stores a second liquid containing the volatile component; and a communicating passage which communicates a space above a liquid level in the first tank with a space above a liquid level in the second tank, wherein a content of the volatile component in the second liquid is higher than a content of the volatile component in the first liquid.

* * * * *